United States Patent
Komarek et al.

(10) Patent No.: US 10,867,036 B2
(45) Date of Patent: Dec. 15, 2020

(54) MULTIPLE PAIRWISE FEATURE HISTOGRAMS FOR REPRESENTING NETWORK TRAFFIC

(71) Applicant: Cisco Technology, Inc., San Jose, CA (US)

(72) Inventors: Tomas Komarek, Frydek Mistek (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 15/730,949

(22) Filed: Oct. 12, 2017

(65) Prior Publication Data
US 2019/0114416 A1    Apr. 18, 2019

(51) Int. Cl.
| | |
|---|---|
| *G06F 21/55* | (2013.01) |
| *H04L 29/06* | (2006.01) |
| *H04L 12/26* | (2006.01) |
| *H04L 29/08* | (2006.01) |
| *G06N 20/00* | (2019.01) |
| *H04L 12/911* | (2013.01) |

(52) U.S. Cl.
CPC .......... *G06F 21/554* (2013.01); *G06N 20/00* (2019.01); *H04L 43/106* (2013.01); *H04L 47/70* (2013.01); *H04L 63/1425* (2013.01); *H04L 67/02* (2013.01)

(58) Field of Classification Search
CPC ...... G06F 11/2028; G06F 16/75; G06F 17/16; H04L 43/08
See application file for complete search history.

(56) References Cited

U.S. PATENT DOCUMENTS

| | | | |
|---|---|---|---|
| 9,690,938 B1 | 6/2017 | Saxe et al. | |
| 2003/0229456 A1* | 12/2003 | Beger | G16C 20/30 702/27 |
| 2012/0134532 A1* | 5/2012 | Ni | G06K 9/00785 382/103 |

(Continued)

OTHER PUBLICATIONS

Cech, et al., "Feature Extraction and Malware Detection on Large HTTPS Data Using MapReduce", SISAP 2016: Similarity Search and Applications, pp. 311-324, 2016, Springer International Publishing AG.

(Continued)

*Primary Examiner* — Barbara B Anyan
(74) *Attorney, Agent, or Firm* — Behmke Innovation Group LLC; Kenneth J. Heywood; Jonathon P. Western

(57) ABSTRACT

In one embodiment, a device divides groups of tuples of traffic characteristics of encrypted network traffic into different pairs of the characteristics. Each of the pairs has a corresponding two dimensional (2-D) feature subspace. The device discretizes the 2-D feature subspaces, to form a plurality of bins in each feature subspace. The device assigns the pairs of the traffic characteristics in a particular group of tuples to the bins in the discretized 2-D feature subspaces. The device forms, for each group of tuples, a vector representation of the group of tuples based on the bins in the discretized 2-D feature subspaces to which the pairs of the traffic characteristics from the group are assigned. The vector representations of the groups of tuples are of a fixed dimension. The device uses the vector representations of the groups of tuples to train a machine learning-based traffic classifier.

18 Claims, 11 Drawing Sheets

(56) References Cited

U.S. PATENT DOCUMENTS

| | | | |
|---|---|---|---|
| 2013/0145010 A1* | 6/2013 | Luna | H04L 47/70 709/223 |
| 2017/0063901 A1 | 3/2017 | Muddu et al. | |
| 2017/0068816 A1 | 3/2017 | Cavazos | |
| 2017/0124478 A1* | 5/2017 | Baradaran | H04L 63/1425 |
| 2017/0168991 A1* | 6/2017 | Baskaran | G06F 17/16 |
| 2018/0262921 A1* | 9/2018 | Buldorini | H04W 24/02 |

OTHER PUBLICATIONS

Kind, et al., "Histogram-Based Traffic Anomaly Detection", IEEE Transactions on Network and Service Management, Jul. 2009, 12 pages, IEEE.

Kohout, et al., "Automatic discovery of web servers hosting similar applications", 2015 IFIP/IEEE International Symposium on Integrated Network Management (IM), 2015, IEEE.

Kohout, et al., "Unsupervised detection of malware in persistent web traffic", 2015 IEEE International Conference on Acoustics, Speech and Signal Processing (ICASSP), 5 pages, 2015, IEEE.

https://en.wikipedia.org/wiki/Mutual_information; Mutual information—Wikipedia; pp. 1-8.

\* cited by examiner

MULTIPLE PAIRWISE FEATURE HISTOGRAMS FOR REPRESENTING NETWORK TRAFFIC

TECHNICAL FIELD

The present disclosure relates generally to computer networks, and, more particularly, to multiple pairwise feature histograms for representing network traffic.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

To further complicate the analysis of network traffic and discerning between different types of traffic, the use of encryption is also steadily increasing. Notably, many websites are now using encryption, thereby protecting the payloads of their corresponding traffic from inspection. Malicious entities are also leveraging this fact to conceal malicious traffic using encryption.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
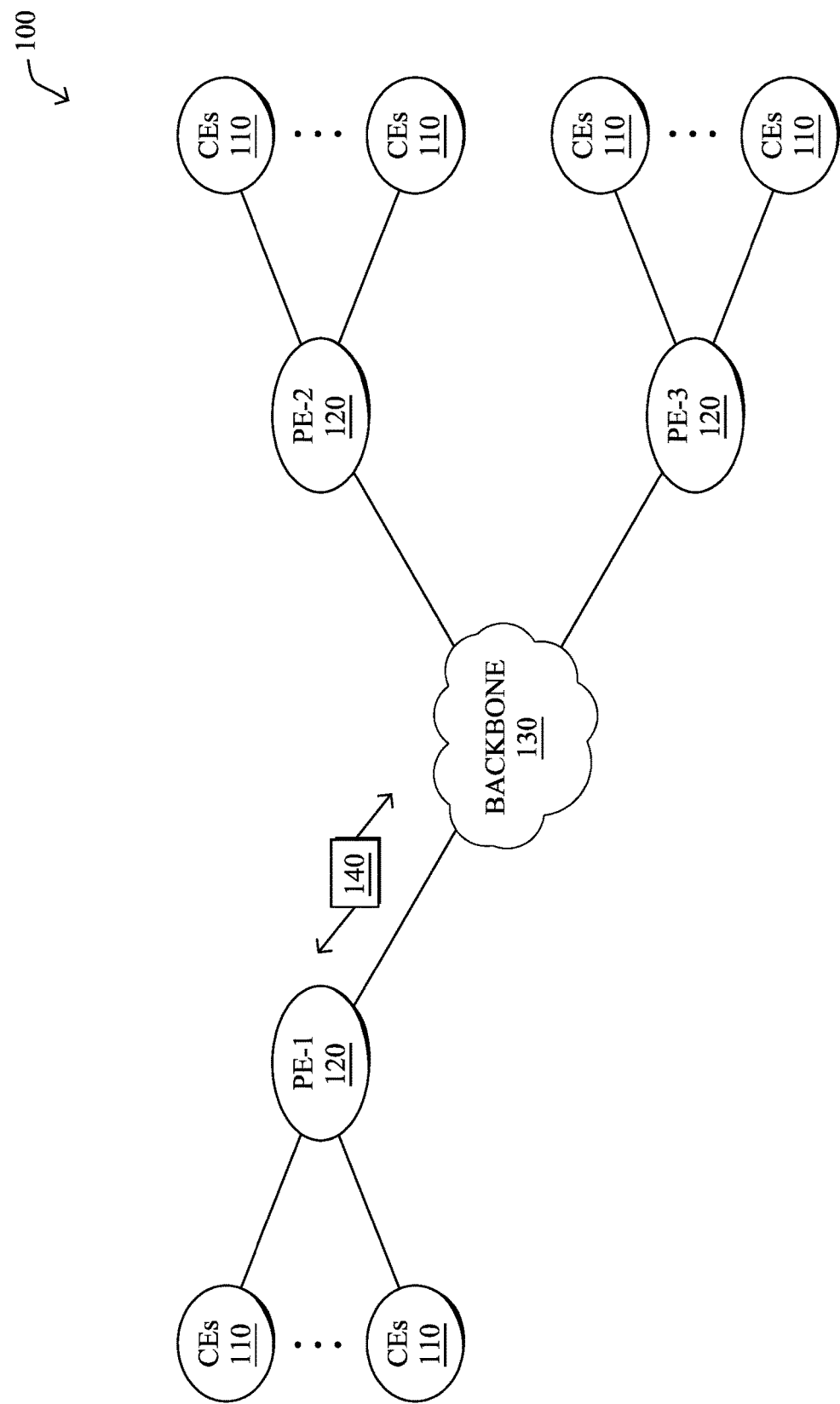
FIGS. 1A-1B illustrate an example communication network.

According to one or more embodiments of the disclosure, a device divides groups of tuples of traffic characteristics of encrypted network traffic into different pairs of the characteristics. Each of the pairs has a corresponding two dimensional (2-D) feature subspace. The device discretizes the 2-D feature subspaces, to form a plurality of bins in each feature subspace. The device assigns the pairs of the traffic characteristics in a particular group of tuples to the bins in the discretized 2-D feature subspaces. The device forms, for each group of tuples, a vector representation of the group of tuples based on the bins in the discretized 2-D feature subspaces to which the pairs of the traffic characteristics from the group are assigned. The vector representations of the groups of tuples are of a fixed dimension. The device uses the vector representations of the groups of tuples to train a machine learning-based traffic classifier.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
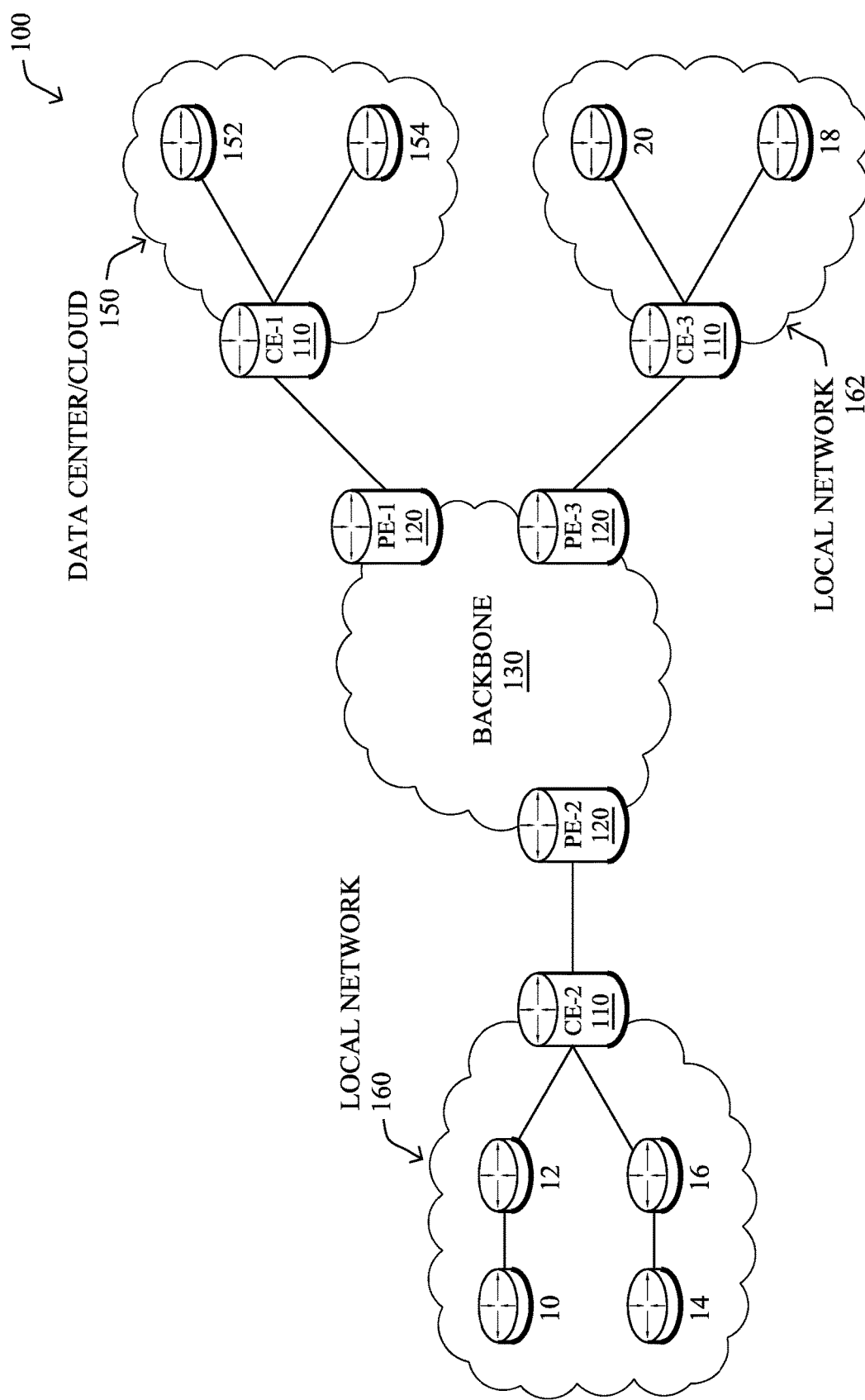

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
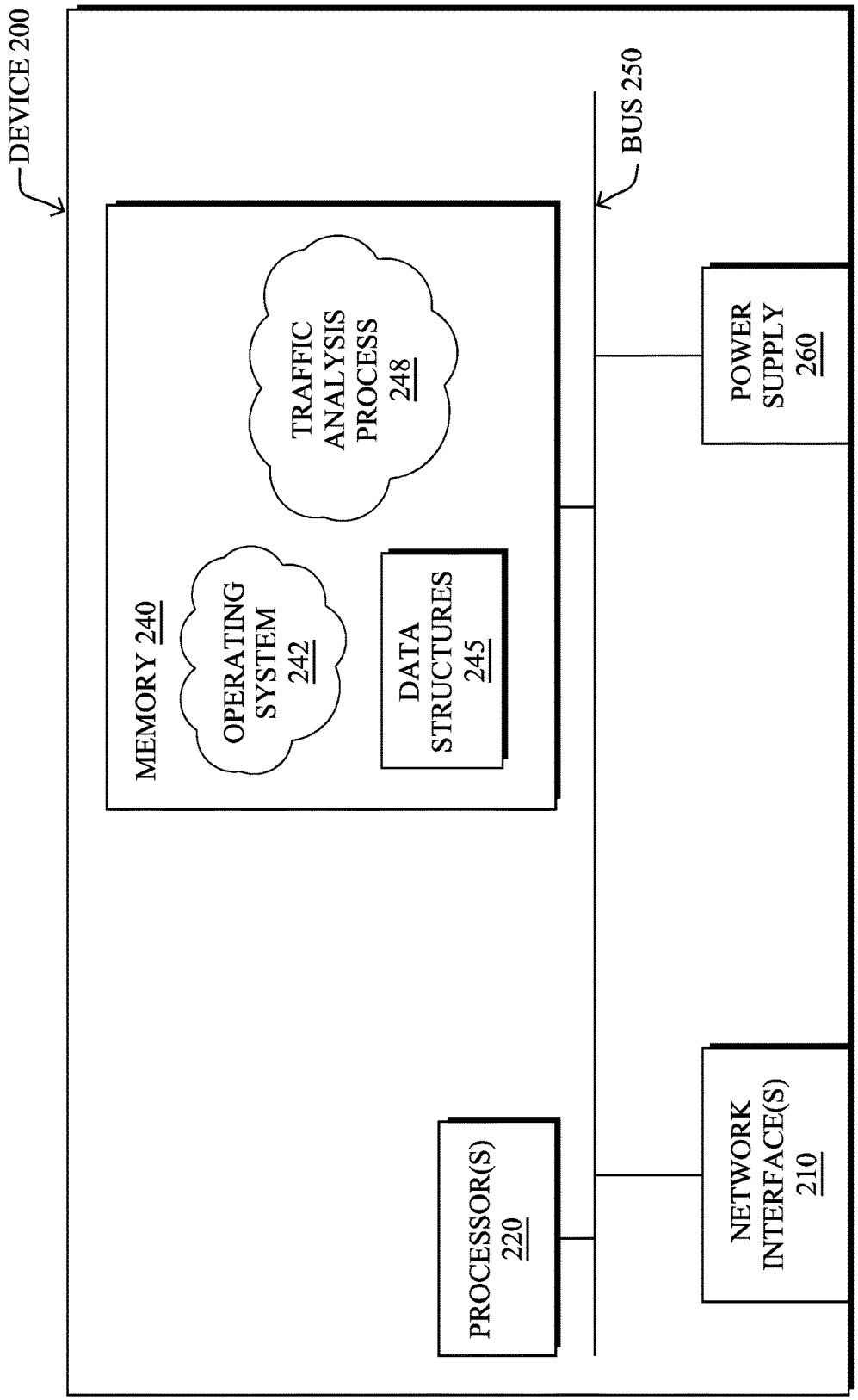
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify traffic in the network for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered traffic data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
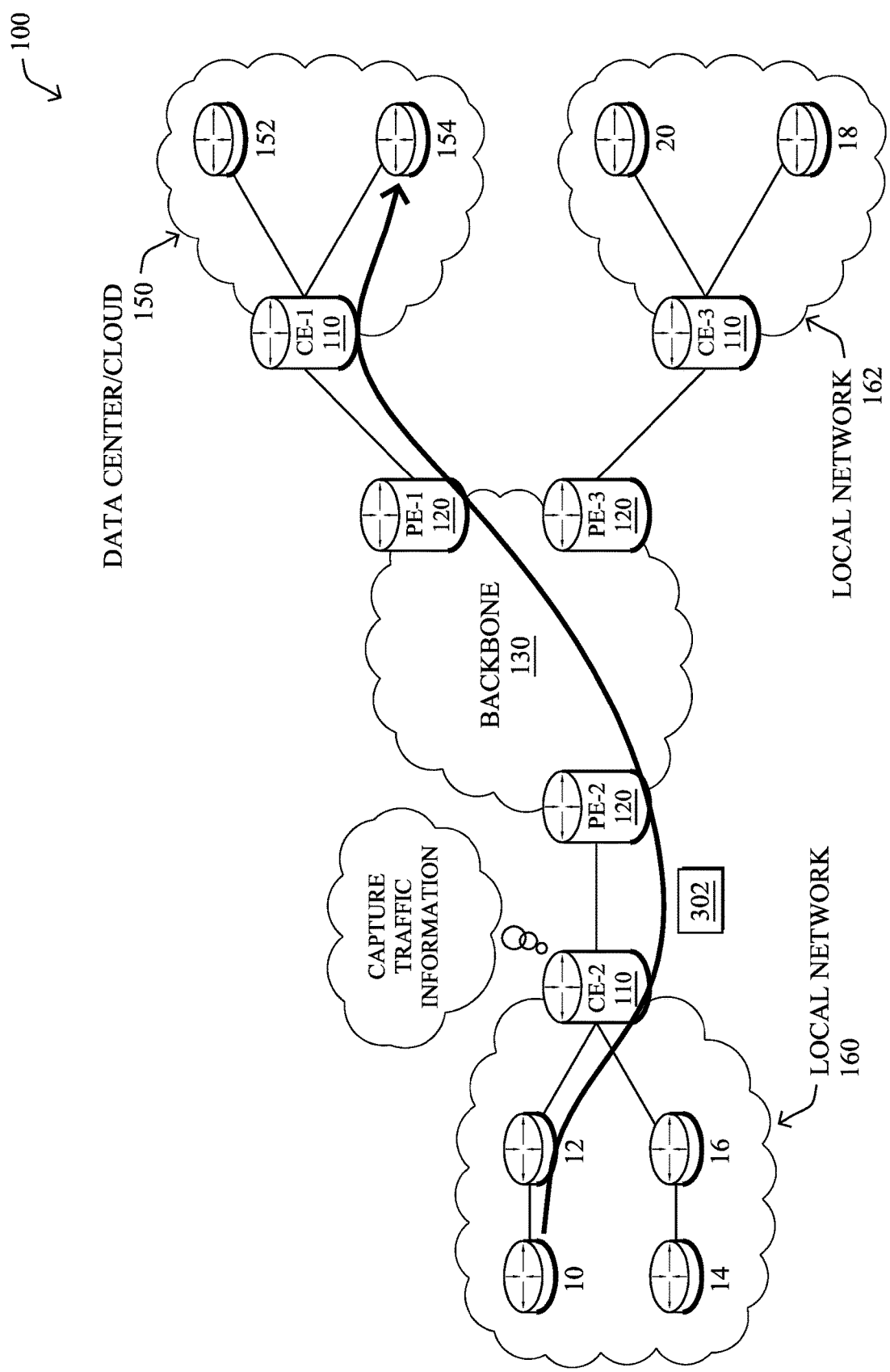
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., Hypertext Transfer Protocol (HTTP) information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

Figure 4:
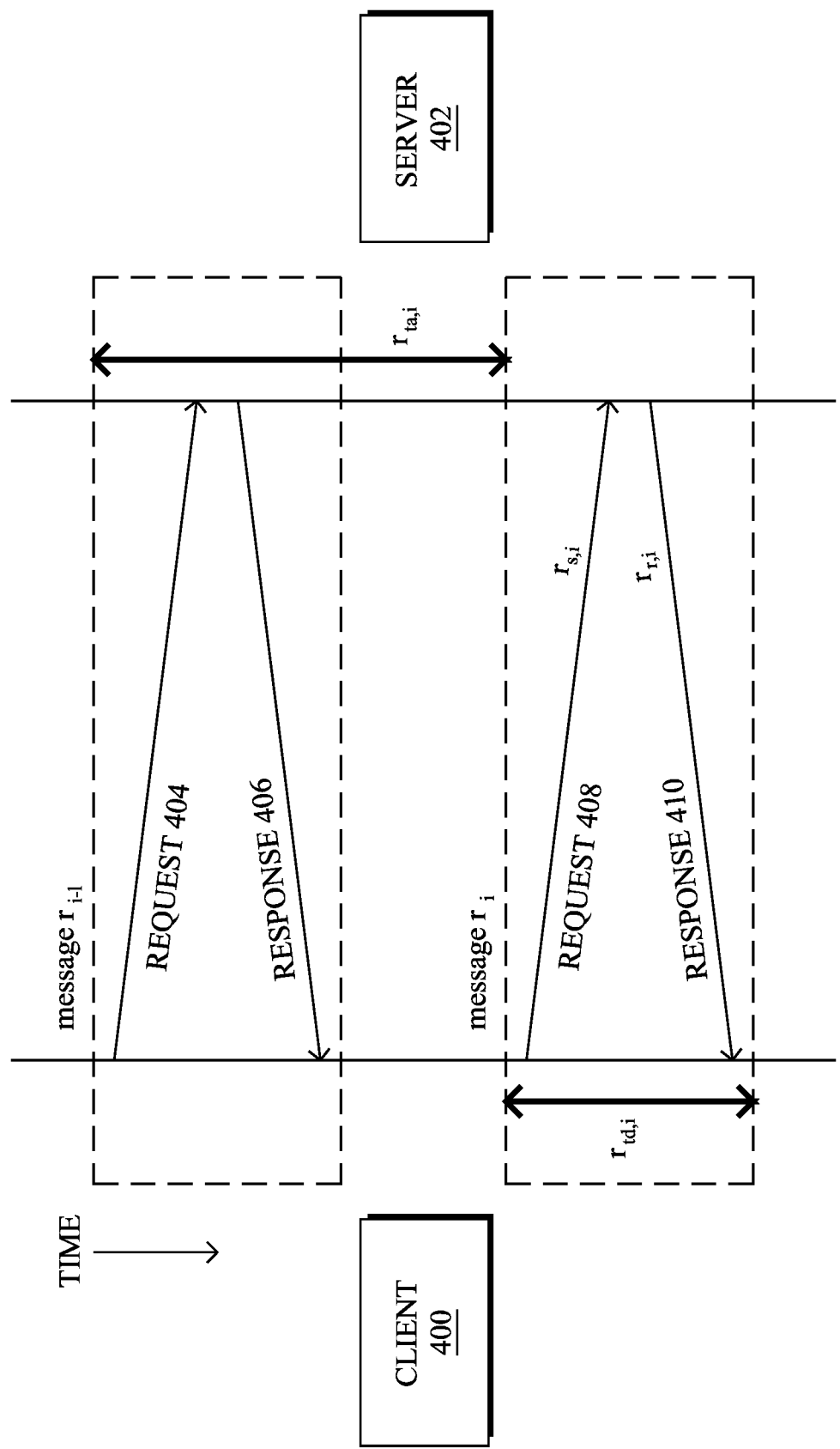
FIG. 4 illustrates an example communication channel.

Operationally, FIG. 4 illustrates an example communication channel, in accordance with various embodiments herein. In general, a communication channel refers to a set of one or more messages exchanged between two given network nodes/hosts over the course of time. For example, as shown, consider the case of a client device 400 that is in communication with a remote server 402. Client 400 and server 402 may exchange any number of messages that may comprise a request and/or a response. For example, individual messages/traffic exchanged between client 400 and server 402 may include, but are not limited to, HTTP(S) request-response pairs, a single TCP or UDP communication, a NetFlow message, domain name system (DNS) request-response pairs, or any other type of network traffic.

An intermediate device located along the path between client 400 and server 402 (e.g., a CE router 110, a cloud service device, a security device, etc.) may capture various traffic data regarding the communication channel shown. For example, such an intermediate device may capture traffic data regarding the $i^{th}$ message exchange, between client device 400 and server 402. Message $r_i$ may comprise a request 408 sent from client 400 to server 402 and a response 410 sent from server 402 to client 400. Similarly, the prior message, $r_{i-1}$, may include a request 404 and a response 406.

The intermediate device between client 400 and server 402 may capture any or all of the following traffic data characteristics regarding message $r_i$:

The number of bytes in request 408 ($r_{s,i}$),

The number of bytes in response 410 ($r_{r,i}$),

The number of packets in request 408 and/or response 410,

The time duration of the request-response (R-R) loop of message $r_i$ ($r_{td,i}$), The inter-arrival time between when client 400 sent request 404 of message $r_{i-1}$ and when client 400 sent request 408 of message $r_i$ ($r_{ta,i}$), Timestamp information or other timing information regarding request 408 and response 410, and/or Header information or any other information available from requests or responses 404-410, themselves.

As would be appreciated, the intermediate device between client 400 and server 402 may capture other features regarding the communication channel, as well, in further embodiments.

To properly analyze the observed network traffic (e.g., to identify the application associated with the traffic), an appropriate representation of captured communication traces is crucial. The representation must be able to capture important patterns of their behavior, while also allowing effective manipulation. Thus, in some embodiments, the network communication channel associated with an application can be treated as a set of independent messages (e.g., packets, NetFlow or IPFIX records, web requests/responses, etc.). For example, if the traffic flow data is captured in a NetFlow or IPFIX record, the messages may be the individual packets sent and received in that record.

In some embodiments, the analyzing device may represent each message of a communication channel as a set of N-number of observed characteristics/features of the message, such as its size, timing, header information, etc. As would be appreciated, the number of different characteristics assessed may be varied and may depend on which features/traffic characteristics are captured in the traffic data. In other words, each message may be represented as an N-dimensional point in a multi-dimensional, metric space, also referred to herein as the "message space." In turn, each communication channel may be viewed as the set of M-number, N-dimensional points that represent the constituent messages of the channel.

As noted above, analyzing network traffic with the usage of machine learning has a broad spectrum of applications, ranging from malware detection and protocol identification to clustering hosts with similar behavior. In both supervised learning cases (e.g., random forests, neural networks, etc.) and unsupervised learning cases (e.g., k-means, etc.), it is often a prerequisite that the network traffic be represented in the form of equally sized, numerical feature vectors.

Typically, representing network traffic as numerical vectors may be done by extracting features from fields of individual flows (e.g., web proxy logs). However, in the case of encrypted network traffic (e.g., HTTPS traffic, assuming there is no man-in-the-middle), analyzing feature vectors parsed from single flows leads to poor performance. The reason for this in the encrypted traffic case is that there is the very limited set of informative features that can be extracted from single flows of an encrypted communication, such as those features described above. Of these, four primary features can still be analyzed, to assess the maliciousness of the traffic: downloaded bytes, uploaded bytes, duration of connection, and inter-arrival time between two consecutive connections to the same domain.

A potentially better approach to representing encrypted network traffic, therefore, would be to focus on information available from groups of flows, as opposed to single flows. In such a case, individual flows can be converted to 4-tuples by extracting the four primary features above, in one embodiment. The groups of 4-tuples might be defined, for example, as all flows from a particular host, all flows from a host to one domain or all flows to one domain, or the like, depending on the scope of a particular task (e.g., detection of infected hosts, identifying malicious connections or servers, etc.). This approach, however, prompts the question: how can the system represent the groups of 4-tuples with equally sized vectors, when the number of 4-tuples might vary from group to group? In addition, the representation of the traffic should also take into consideration the fact that time related features (e.g., duration and inter-arrival time) are very noisy as they are affected by an actual load of intermediate nodes in the network, such as routers, switches, etc.

One approach would be to use the idea of "soft histograms," to represent the 4-tuples with single vectors for server clustering and malware detection. In general, this entails discretizing the four dimensional (4-D) feature space with a single 4-D grid of 11 intervals in each dimension, thereby producing $11^4=14,641$ equally sized bins. Each group of 4-tuples is then considered as a distribution and a soft histogram, with the defined bin positions constructed to represent the distribution (e.g., the group) with a numerical vector. Elements of the vector then correspond to the bin values. Unlike conventional histograms using hard assignments, soft histograms distribute the contribution of each 4-tuple among multiple neighbor bins using a triangular filter function to smooth out small disturbances in the data.

Multiple Pairwise Feature Histograms for Representing Network Traffic

The techniques herein introduce a way to represent network traffic based on multiple pairwise feature histograms that can be used for modelling network communication patterns that are observable through timing information and transferred bytes in groups of flows. This approach has been designed to be robust with respect to arbitrarily large changes in one or more characteristic input features. In addition, it has been shown through testing to represent encrypted network traffic particularly well, where the characteristic features may be subject to large amounts of noise, especially those features that are time-related.

Specifically, according to one or more embodiments of the disclosure as described in detail below, a device divides groups of tuples of traffic characteristics of encrypted network traffic into different pairs of the characteristics. Each of the pairs has a corresponding two dimensional (2-D) feature subspace. The device discretizes the 2-D feature subspaces, to form a plurality of bins in each feature subspace. The device assigns the pairs of the traffic characteristics in a particular group of tuples to the bins in the discretized 2-D feature subspaces. The device forms, for each group of tuples, a vector representation of the group of tuples based on the bins in the discretized 2-D feature subspaces to which the pairs of the traffic characteristics from the group are assigned. The vector representations of the groups of tuples are of a fixed dimension. The device uses the vector representations of the groups of tuples to train a machine learning-based traffic classifier.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, according to various embodiments, the techniques herein encode groups of tuples of traffic characteristics into single vectors of a fixed dimension, each tuple representing a single encrypted traffic flow in captured telemetry data. For example, such a tuple may be a 4-tuple of traffic characteristics for an encrypted traffic flow that includes the observed downloaded bytes, uploaded bytes, connection duration, and inter-arrival time of the flow.

In general, the techniques herein leverage the use of histograms. In some embodiments, given a set of histogram bins positions, the processing device may represent each group of tuples as the number of its 4-tuples residing at each bin. This way, it is guaranteed that the dimensionality of the representation, which equals to the number of bins, remains the same for an arbitrarily large group of 4-tuples.

Once the device obtains the tuples of traffic characteristics, it may group the tuples according to some criteria. For example, one group of tuples may represent all of the flows associated with a particular host in a network. In another example, a group of tuples may represent all flows between one or more hosts and a particular domain or set of domains. In yet another embodiment, the group of tuples may represent all traffic flows associated with a particular domain. As would be appreciated, the tuples, which represent individual traffic flows, may be grouped according to any desired criteria.

In addition to grouping the tuples of traffic characteristics, the device may divide the tuples into different pairs of traffic characteristics. For example, in the 4-tuple case above, there are six possible combinations of feature pairs: [bytes_upload, bytes_download], [bytes_upload, duration], [bytes_upload, inter_arrival_time], [bytes_download, duration], [bytes_download, inter_arrival_time], [duration, inter_arrival_time]). In other words, each of these pairs exists in a two dimensional (2-D) feature subspace.

In contrast to a soft histogram-based approach which discretizes the four dimensional (4-D) feature space into a single, equidistant grid with 4-D bins, the techniques herein propose that the device discretize each 2-D feature pair subspace with multiple grids of various characteristics, to produce (potentially overlapping) 2-D bins of various sizes.

Figure 5A:
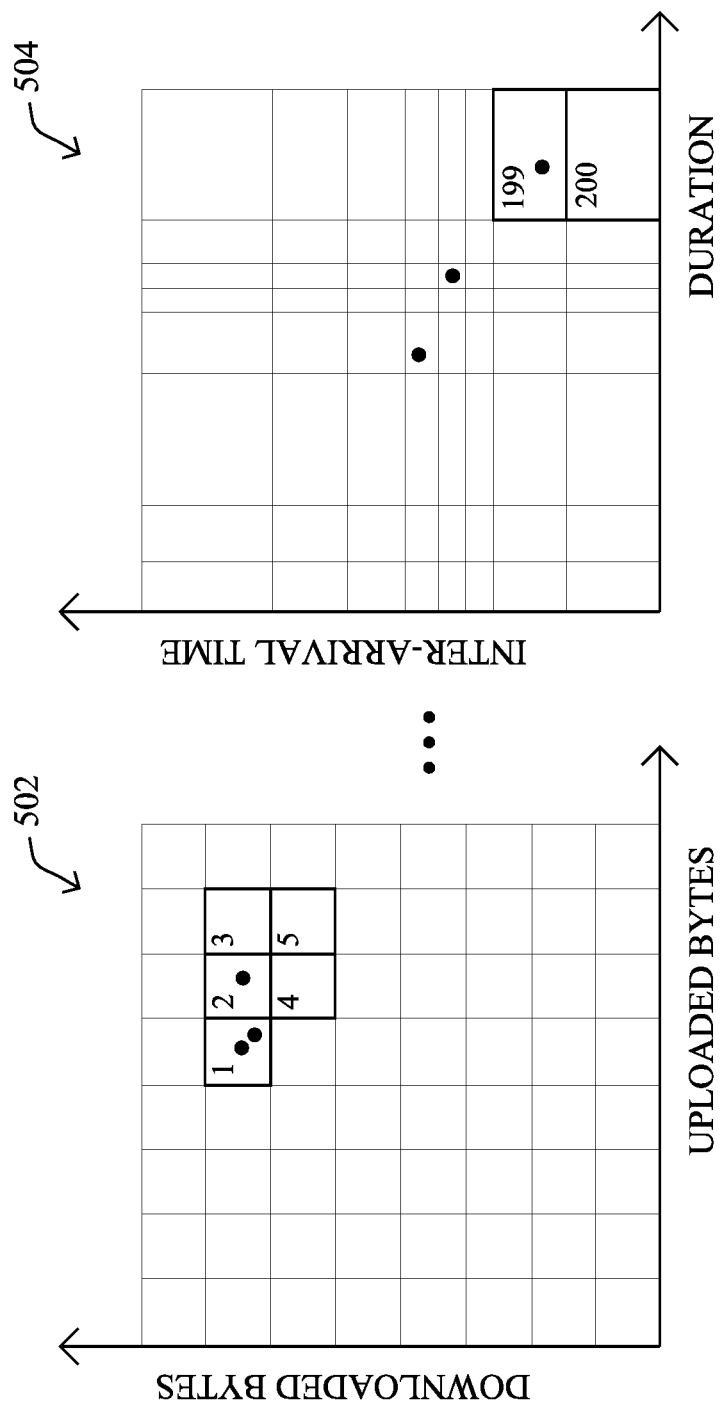
FIGS. 5A-5B illustrate examples of representing groups of tuples of traffic characteristics as vector representations.

FIG. 5A illustrates an example of the discretization of the 2-D feature subspaces in which the pairs of traffic characteristics from the groups of tuples reside. For example, grid 502 represents the discretization of the 2-D feature subspace in which the feature pairs [bytes_upload, bytes_download] are located. Similarly, grid 504 represents the discretization of the 2-D feature subspace in which the feature pairs [duration, inter_arrival_time] are located. Typically, the discretization of the 2-D feature subspaces only needs to be performed once during training. Then, during actual deployment or testing, the identified bins from the training stage can be used.

In various embodiments, the number of bins used to form the vector representations of the groups of tuples may be a function of the number of feature pairs, the number of desired intervals, and/or the number of different discretization techniques applied. The feature ranges that define the regions of the 2-D subspaces to discretize may be estimated from a corpus of all training tuples. In turn, these regions may be divided into 8, 16, or any other number of intervals using any number of discretization strategies, as desired.

As would be appreciated, the number of resulting bins in a given grid is a function of the chosen discretization density. For example, in the case of 8 intervals, the grid (i.e., histogram) will have 64 bins. In another example, in the case of 16 intervals, the resulting grid will have 256 bins. Such a division may also be performed multiple times for a given 2-D feature subspace using different discretization strategies. For example, as shown in FIG. 5A, there may be a total of 36 grids through the use of six different feature pairs, two different discretization densities (e.g., intervals of 8 and 16), and three different discretization strategies, giving 6×2×3=36 grids. In addition, there are 6×(64+256)×3=5,760 total bins.

In various embodiments, example discretization strategies that can be used may include, but are not limited to, any or all of the following:
Uniform discretization—dividing a range of a given feature into a desired number of equally sized intervals (e.g., 8 or 16). This a purely unsupervised discretization strategy that uses the data only for estimating range bounds of the given feature.
Quantile discretization—dividing the feature range into a defined number of intervals (e.g., 8 or 16) such that each interval includes the same number of data points. This discretization strategy usually produces bins of distinct sizes respecting the occurrence of data points. In the case of labeled data (e.g., a binary classification problem, such as labeling traffic as "malicious" or "benign"), this discretization strategy can be performed on each class, separately. For example, in the case of binary malware classification, this strategy can be applied twice: once on positive examples of training data and again for negative data.

In various embodiments, the traffic analysis device may also select the bins from the discretization for use in the vector representations. For example, in the case where the vector representations are to be used for classification, the device may select only the discriminative bins that are relevant for the classification. Since the number of important bins for classification is typically significantly lower than the number of all generated bins, this can significantly reduce the computational costs in the final deployment. For example, of the illustrative 5,760 bins in FIG. 5A, the device may select only 200 for use in the vector representation, which can also help avoid overfitting during model training.

The device may use any of a number of different techniques to select which bins are used for the vector representations. For example, in one case, the device may use an approach known as mutual information, which assigns a score to each bin (e.g., a feature of the new representation), according to the measure of mutual dependence in between the bin and class labels on the training data. Therefore, the final set of selected bins is determined on the basis of a graph showing the sorted bins according to the assigned scores.

Figure 6B:
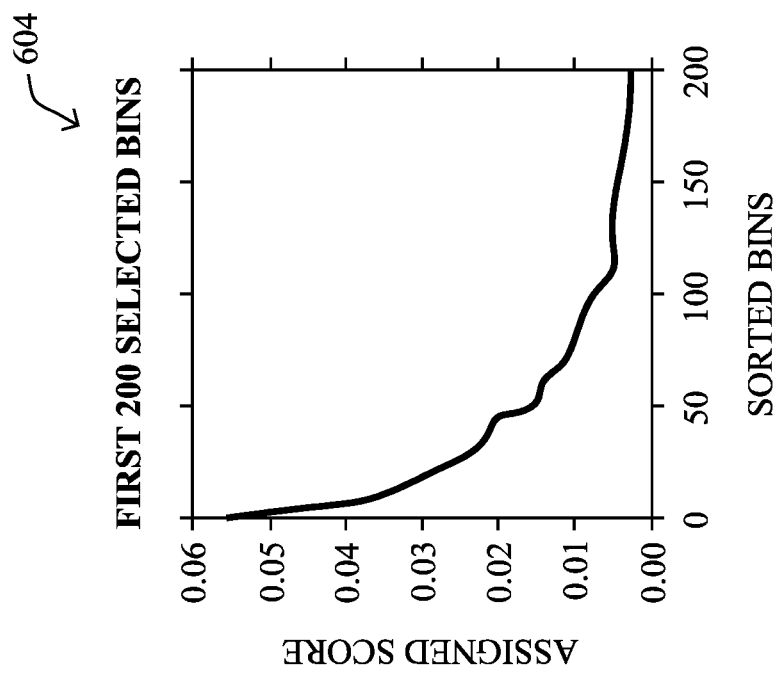
FIGS. 6A-6B illustrates examples of mutual information between bins.
Figure 6A:
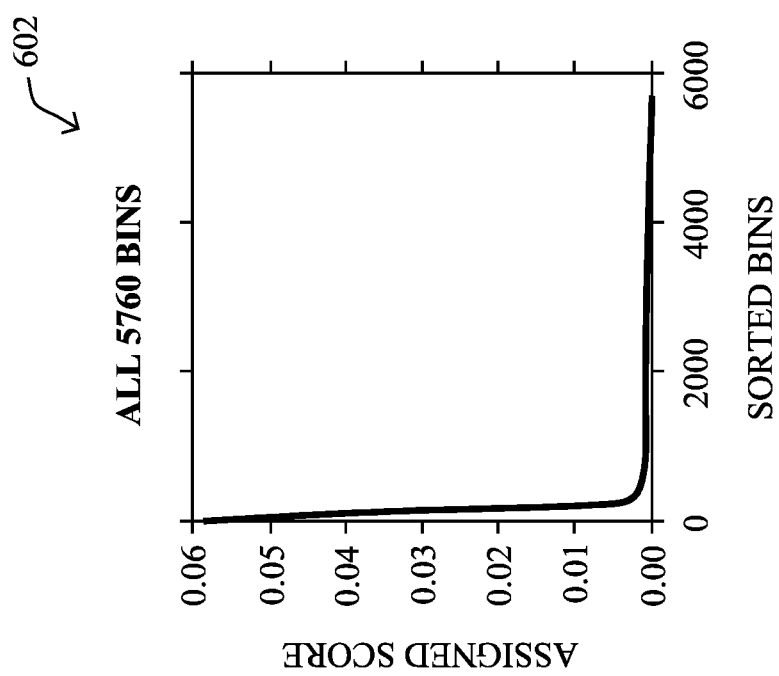

FIGS. 6A-6B illustrates examples of mutual information between bins, according to various embodiments. Continuing the example of FIG. 5A, plot 602 in FIG. 6A illustrates the assigned mutual information scores for all of the 5,760 bins in the 2-D feature subspaces. Conversely, plot 604 in FIG. 6B illustrates a plot of the 200 selected bins, using the mutual information approach above.

To actually form the vector representations of the groups of tuples of traffic characteristics, the device may assess the pairs of characteristics that are assigned to the bins in the 2-D subspaces, according to their values. This results in each bin having a count of assigned pairs of traffic characteristics. For example, as shown in FIG. 5A, the bin designated '1' may have two of the pairs of traffic characteristics assigned, the bin designated '2' may have a single pair assigned, etc., up to the bin designated '199' that has a single pair assigned. In various embodiments, the device can then represent the entire group of tuples as a single vector representation based on the counts of bin assignments. For example, vector representation 506 in FIG. 5B may be of a dimension equal to the number of bins used, with values based on the bin assignment counts. Notably, bin '1' may be assigned value '2' to represent to two pairs of traffic characteristics assigned to that bin, bin '2' may be assigned value '1,' and so forth.

Note that the motivation behind using 2-D histograms (e.g., as opposed to 1-D, 3-D, or 4-D) is a practical balance between expressiveness and robustness of the representation. Notably, the 2-D bins already capture the relationships between two features/traffic characteristics, yet these relationships are not affected by any changes in other two features.

Figure 5B:
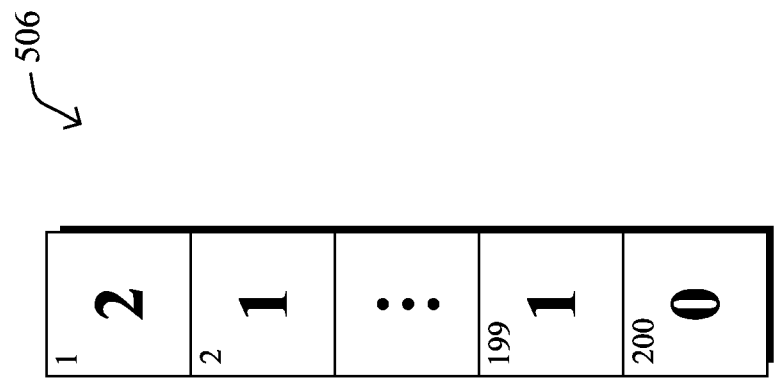

By way of example, consider vector representation 506 in FIG. 5B that is formed based on the selected bins shown in FIG. 5A. In this representation, the first five elements of the representation capturing the information from the viewpoint of transferred bytes viewpoint would remain unaffected, even if values of time related features were markedly shifted. In the case of 3-D or 4-D bins, all three 4-tuples would be assigned to different bins after the shift, which would result in a vector representation that has completely different values. Since the shift of time-related features can be caused independently on the modelled behavior (e.g., by a higher load of intermediate nodes in a network) and, at the same time, this information from the features would otherwise be lost, the 2-D histogram approach has proven to be effective.

Figure 7:
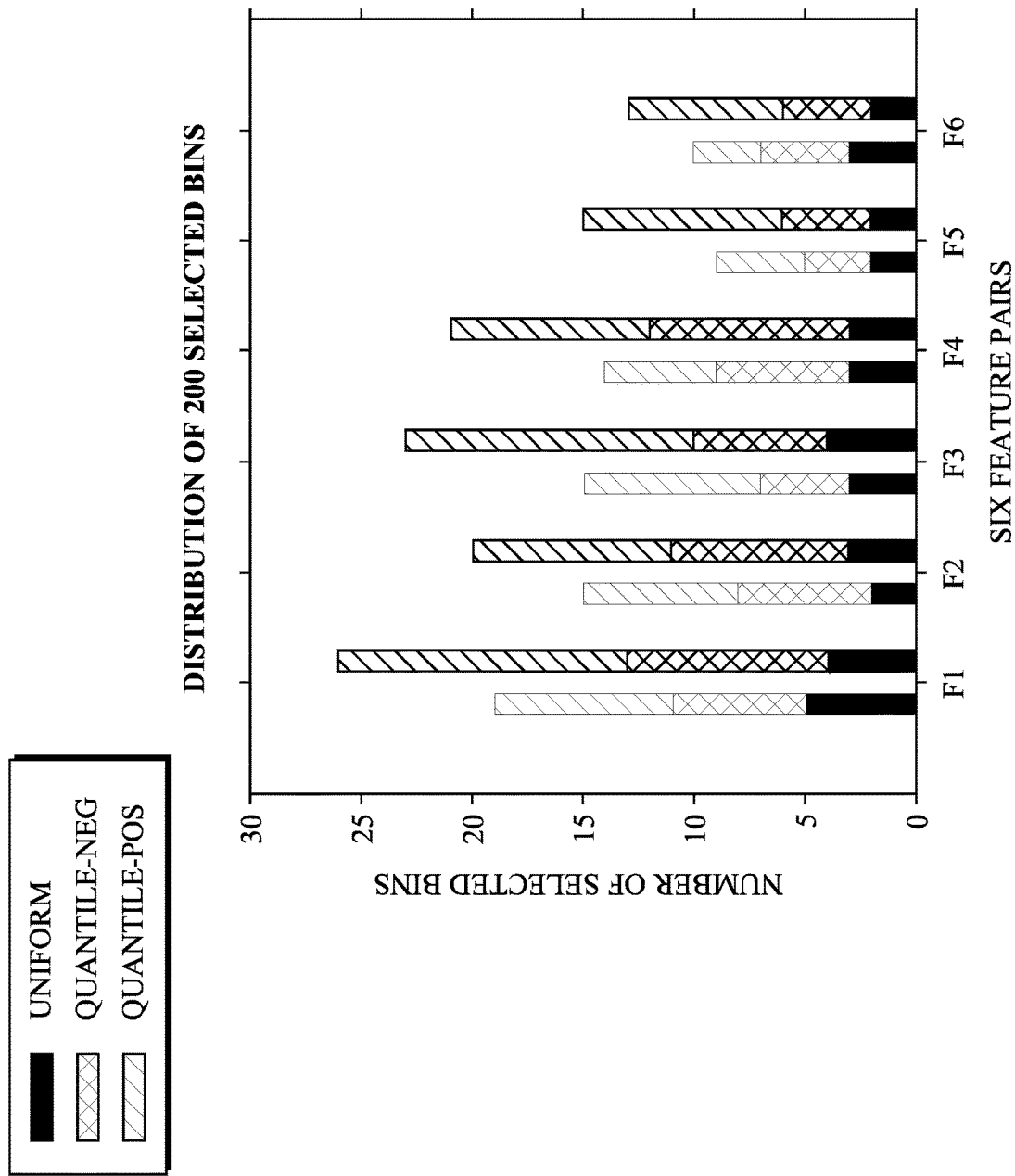
FIG. 7 illustrates a plot of selected bins versus feature pairs.

The benefits of using 2-D histograms is also supported by the fact that the majority of selected bins for the vector representation comes from histograms constructed on the first feature pair (e.g., the non-time related features [bytes_up, bytes_down]) and the lowest number of selected bins originates from the sixth feature pair (e.g., time related features [duration, inter_arrival_time]). FIG. 7 illustrates a plot 700 of selected bins versus feature pairs, to show this point.

In FIG. 7, the following notation is used to represent the different pairs of traffic characteristics:
F1=[bytes_upload, bytes_download]
F2=[bytes_upload, duration]
F3=[bytes_upload, inter_arrival_time]
F4=[bytes_download, duration]
F5=[bytes_download, inter_arrival_time]
F6=[duration, inter_arrival_time]

The discretization strategies used are noted in plot 700 (e.g., uniform, quantile-negative, and quantile-positive). In addition, for each of the feature pairs, two bars are shown, with the left bar representing a discretization density of 64 and the right bar representing the discretization density of 256.

Preliminary testing of the techniques herein was also performed on the task of detecting network hosts that are infected with malware communicating over the HTTPS protocol. This task was formulated as a binary classification problem, where a classification model is first learned on a training set and then evaluated on an independent testing set. In particular, the training dataset used to test the techniques herein comprised traffic captures of 2,000,000 clean and 2,800 infected hosts. In addition, a testing dataset of traffic captures comprising 31,607,364 clean and 1,578 infected hosts was used, to assess the efficacy of the trained classifier.

In both of the training and testing datasets, a host corresponds to a group of HTTPS log records that share the same hostname and were generated within the same five minute time window. All HTTPS log records were converted to 4-tuples by extracting the set of four features (i.e., downloaded bytes, uploaded bytes, duration of connection and inter-arrival time between two consecutive connections to the same domain), from each log entry. The feature values were further transformed with the logarithm function $y=\log(1+x)$, to suppress noise and decrease ranges of the features. The techniques herein were then applied to each host (e.g., a group of 4-tuples), to determine its representation as a single numerical vector of dimension 200.

Figure 8:
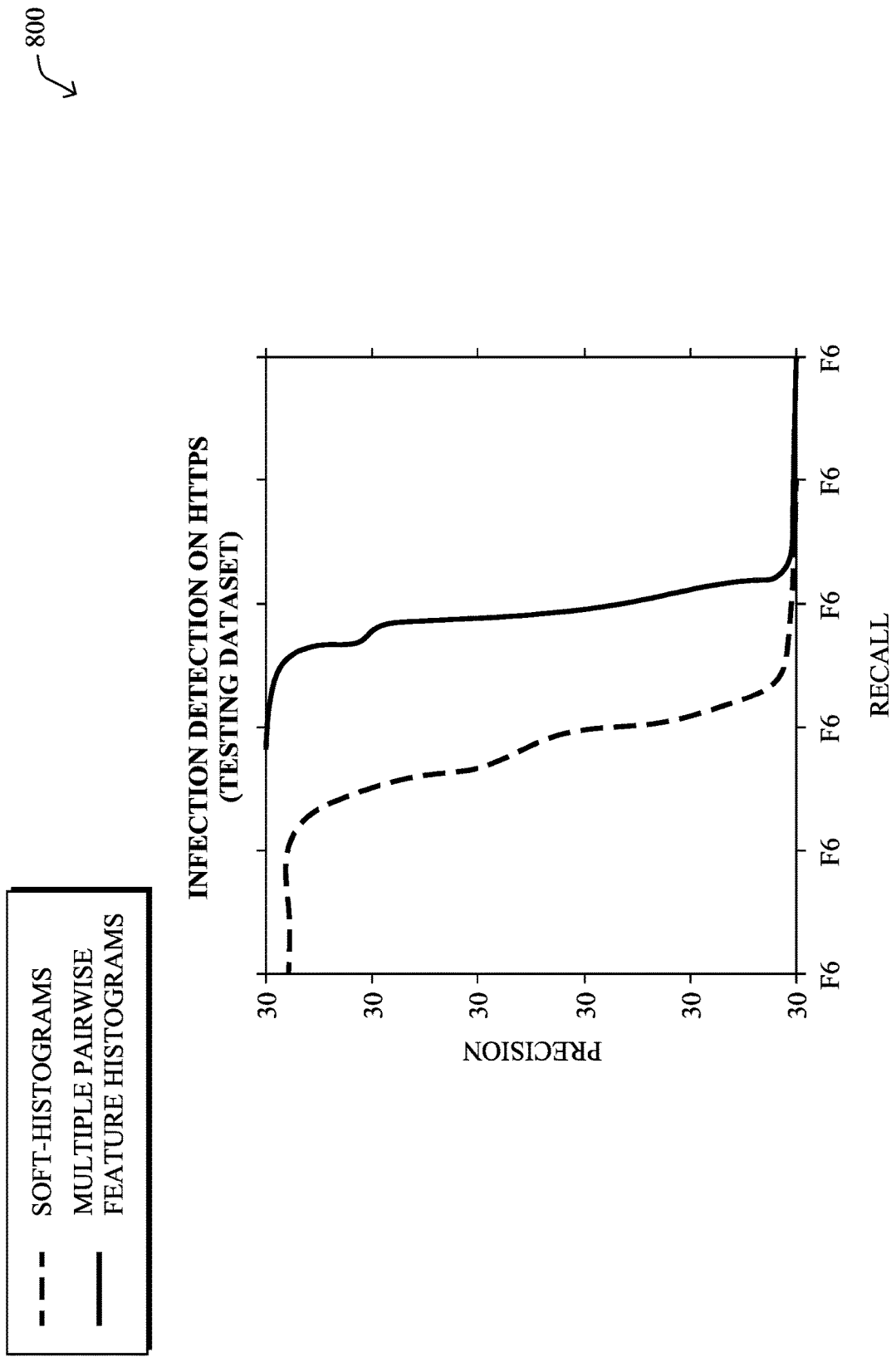
FIG. 8 illustrates an example plot of test results for the techniques herein.

As a point of comparison, a soft histogram approach was also used on the training dataset and testing datasets. A classification model using a random decision forest was trained and used to compare the techniques herein to the soft histogram approach. The results of this comparison are shown in the precision-recall curves in plot 800 of FIG. 8. As can be seen, the techniques herein allow the malware classifier to detect approximately twice as many infected hosts with the same or even higher precision than using the soft histogram approach. The large decrease in precision after 50% recall indicates an inability to reliably detect more than a half of infections contained in the testing dataset. Considering the fact that only four simple features were used for the detection, it is also reasonable not to expect all infected hosts to be detected with a high confidence.

Figure 9:
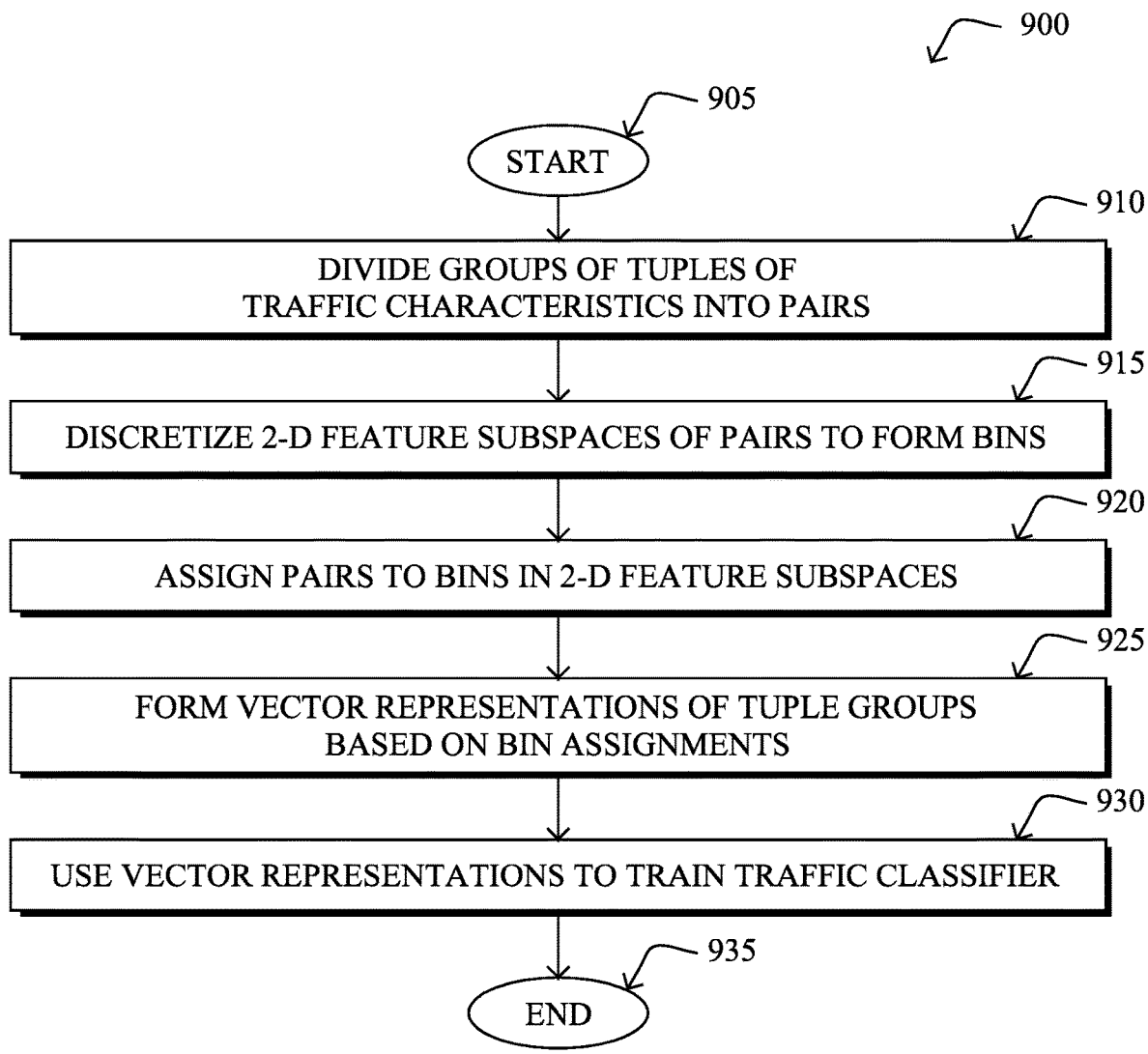
FIG. 9 illustrates an example simplified procedure for representing network traffic.

FIG. 9 illustrates an example simplified procedure for representing network traffic, in accordance with one or more embodiments described herein. For example, a non-generic, specifically configured device (e.g., device 200) may perform procedure 900 by executing stored instructions (e.g., process 248). The procedure 900 may start at step 905, and continues to step 910, where, as described in greater detail above, the device may divide groups of tuples of traffic characteristics of encrypted network traffic into different pairs of the characteristics, each pair having a corresponding two dimensional (2-D) feature subspace. For example, in one embodiment, a given tuple may be a 4-tuple of traffic characteristics for an encrypted traffic flow that includes the downloaded bytes, uploaded bytes, connection duration, and inter-arrival time of the flow. Such tuples may be grouped by any desirable criteria such as by client/host, domain, time period, or the like. Pairs of such characteristics may then be [bytes_download, bytes_upload], [bytes_download, duration], etc. As would be appreciated, the division may entail the formation of one or more data structures in memory or, alternatively, simply entail selecting different pairs of characteristics from tuples already stored in memory.

At step 915, as detailed above, the device may discretize the 2-D feature subspaces, to form a plurality of bins in each feature subspace. Various discretization strategies may be used, in some embodiments, such as uniform discretization, quantile discretization (e.g., on positive examples and/or on negative examples), or the like. As would be appreciated, the total number of bins may be a function of the number of different types of pairs of traffic characteristics being used, the desired discretization intervals (e.g., 8, 16, etc.), and/or the number of different discretization strategies used. In some embodiments, the device may also define the regions of the 2-D feature subspace for discretization based on the range of values found in the dataset.

At step 920, the device may assign the pairs of the traffic characteristics in a particular group of tuples to the bins in the discretized 2-D feature subspaces, as described in greater detail above. For example, a given pair of features such as [bytes_download, bytes_upload] may be assigned to a given bin or multiple bins across different sets of bins, such as when different discretization strategies are used in combination.

At step 925, as detailed above, the device may form, for each group of tuples, a vector representation of the group of tuples based on the bins in the discretized 2-D feature subspaces to which the pairs of the traffic characteristics from the group are assigned. In various embodiments, the vector representations of the groups of tuples are of a fixed dimension. For example, each vector representation may have a fixed dimension equal to the number of bins assessed to form the vectors. In some embodiments, the device may also sub-select which of the bins should be used to form the vector representations, such as by scoring each of the bins according to a measure of mutual independence between a given bin and a class label used by the classifier, and selecting the top n-number of scored bins.

At step 930, the device may use the vector representations of the groups of tuples to train a machine learning-based traffic classifier, as described in greater detail above. In various embodiments, such a classifier may be configured to detect malware by analyzing the encrypted traffic, configured to assign hosts associated with the encrypted traffic that exhibit similar network behaviors to behavioral clusters of hosts, or configured to perform other analysis. After training, the device may further send the classifier for deployment to one or more networks (e.g., for execution in the network). Procedure 900 then ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a way to represent network traffic characteristics for use by a traffic analyzer, such as a malware classifier or host/server clustering process. In some aspects, the proposed representation can be used for modelling both encrypted and non-encrypted network traffic. Further, the representation is independent on the applied classification model (e.g., random forests) or any other machine learning technique. Additionally, the vectorized traffic representation can be used in combination with supervised as well as unsupervised machine learning processes, and in a lightweight manner.

While there have been shown and described illustrative embodiments that provide for representing network traffic, it is to be understood that various other adaptations and modifications may be made within the spirit and scope of the embodiments herein. For example, while certain embodiments are described herein with respect to using certain models for purposes of malware detection or behavioral clustering, the models are not limited as such and may be used for other functions, in other embodiments. In addition, while certain protocols are shown, such as HTTPS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
dividing, by a device, groups of tuples of traffic characteristics of encrypted network traffic into a plurality of different pairs of the characteristics, each pair having a corresponding two- dimensional (2-D) feature subspace, wherein the encrypted network traffic is associated with a plurality of hosts in a network;
discretizing, by the device, the 2-D feature subspaces, to form a plurality of bins in each feature subspace, wherein each 2-D feature subspace is discretized with multiple grids of various characteristics, and the bins are of various sizes;
assigning, by the device, the pairs of the traffic characteristics in a particular group of tuples to the bins in the discretized 2-D feature subspaces;
forming, by the device and for each group of tuples, a vector representation of the group of tuples based on the bins in the discretized 2-D feature subspaces to which the pairs of the traffic characteristics from the group are assigned, wherein the vector representations of the groups of tuples are of a fixed dimension;
using, by the device, the vector representations of the groups of tuples to train a machine learning-based traffic classifier; and
assigning, by the device, hosts among the plurality of hosts associated with the encrypted network traffic that exhibit a similar network behavior to a behavioral cluster of hosts using the trained machine learning-based traffic classifier.

2. The method as in claim 1, wherein the classifier is configured to detect malware by analyzing encrypted network traffic.

3. The method as in claim 1, wherein the encrypted network traffic comprises Hypertext Transfer Protocol Secure (HTTPS) traffic.

4. The method as in claim 1, wherein each tuple is a 4-tuple of traffic characteristics for an encrypted traffic flow comprising: downloaded bytes, uploaded bytes, connection duration, and inter-arrival time.

5. The method as in claim 1, wherein discretizing the 2-D feature subspaces comprises:
performing, by the device, uniform discretization on the 2-D feature subspaces.

6. The method as in claim 1, wherein discretizing the 2-D feature subspaces comprises:
performing, by the device, quantile discretization on the 2-D feature subspaces.

7. The method as in claim 1, further comprising:
select, by the device, bins in the discretized 2-D subspaces for use in the vector representations by scoring each of the bins according to a measure of mutual independence between a given bin and a class label used by the classifier.

8. The method as in claim 1, further comprising:
sending, by the device, the trained traffic classifier for deployment to a network.

9. An apparatus, comprising:
one or more network interfaces to communicate with a network;
a processor coupled to the network interfaces and configured to execute one or more processes; and
a memory configured to store a process executable by the processor, the process when executed configured to:
divide groups of tuples of traffic characteristics of encrypted network traffic into a plurality different pairs of the characteristics, each pair having a corresponding two- dimensional (2-D) feature subspace, wherein a plurality of hosts in a network are associated with the encrypted network traffic;
discretize the 2-D feature subspaces, to form a plurality of bins in each feature subspace, wherein each 2-D feature subspace is discretized with multiple grids of various characteristics, and the bins are of various sizes;
assign the pairs of the traffic characteristics in a particular group of tuples to the bins in the discretized 2-D feature subspaces;
form, for each group of tuples, a vector representation of the group of tuples based on the bins in the discretized 2-D feature subspaces to which the pairs of the traffic characteristics from the group are assigned, wherein the vector representations of the groups of tuples are of a fixed dimension;
use the vector representations of the groups of tuples to train a machine learning-traffic classifier; and
assign hosts among the plurality of hosts associated with the encrypted network traffic that exhibit a similar network behavior to a behavioral cluster of hosts using the trained machine learning-based traffic classifier.

10. The apparatus as in claim 9, wherein the classifier is configured to detect malware by analyzing encrypted network traffic.

11. The apparatus as in claim 9, wherein the fixed dimension is equal to a number of bins to which the pairs can be assigned.

12. The apparatus as in claim 9, wherein each tuple is a 4-tuple of traffic characteristics for an encrypted traffic flow comprising: downloaded bytes, uploaded bytes, connection duration, and inter-arrival time.

13. The apparatus as in claim 9, wherein the apparatus discretizes the 2-D feature subspaces by:
performing uniform discretization on the 2-D feature subspaces.

14. The apparatus as in claim 9, wherein the apparatus discretizes the 2-D feature subspaces by:
performing quantile discretization on the 2-D feature subspaces.

15. The apparatus as in claim 9, wherein the process when executed is further configured to:
select bins in the discretized 2-D subspaces eligible for use in the vector representations by scoring each of the bins according to a measure of mutual independence between a given bin and a class label used by the classifier.

16. The apparatus as in claim 9, wherein the process when executed is further configured to:

send the trained traffic classifier for deployment to a network.

17. A tangible, non-transitory, computer-readable medium storing program instructions that cause a device to execute a process comprising:
- dividing, by the device, groups of tuples of traffic characteristics of encrypted network traffic into a plurality of different pairs of the characteristics, each pair having a corresponding two-dimensional (2-D) feature subspace, wherein a plurality of hosts in a network are associated with the encrypted network traffic;
- discretizing, by the device, the 2-D feature subspaces, to form a plurality of bins in each feature subspace, wherein each 2-D feature subspace is discretized with multiple grids of various characteristics, and the bins are of various sizes;
- assigning, by the device, the pairs of the traffic characteristics in a particular group of tuples to the bins in the discretized 2-D feature subspaces;
- forming, by the device and for each group of tuples, a vector representation of the group of tuples based on the bins in the discretized 2-D feature subspaces to which the pairs of the traffic characteristics from the group are assigned, wherein the vector representations of the groups of tuples are of a fixed dimension;
- using, by the device, the vector representations of the groups of tuples to train a machine learning-based traffic classifier; and
- assigning, by the device, hosts among the plurality of hosts associated with the encrypted network traffic that exhibit a similar network behavior to a behavioral cluster of hosts using the trained machine learning-based traffic classifier.

18. The computer-readable medium as in claim 17, wherein each tuple is a 4-tuple of traffic characteristics for an encrypted traffic flow comprising: downloaded bytes, uploaded bytes, connection duration, and inter-arrival time.

* * * * *

UNITED STATES PATENT AND TRADEMARK OFFICE
CERTIFICATE OF CORRECTION

PATENT NO. : 10,867,036 B2
APPLICATION NO. : 15/730949
DATED : December 15, 2020
INVENTOR(S) : Tomas Komarek et al.

It is certified that error appears in the above-identified patent and that said Letters Patent is hereby corrected as shown below:

In the Specification

Column 7, Line 66, please amend as shown:
data regarding the $i^{th}$ message exchange, $r_i$, between client Column 16, Line 35, please amend as shown:
train a machine learning-based traffic classifier; and Signed and Sealed this
Second Day of March, 2021

Drew Hirshfeld
*Performing the Functions and Duties of the*
*Under Secretary of Commerce for Intellectual Property and*
*Director of the United States Patent and Trademark Office*